(12) United States Patent
Varga (10) Patent No.: US 7,062,087 B1
(45) Date of Patent: Jun. 13, 2006

(54) SYSTEM AND METHOD FOR OPTIMIZING COLOR COMPRESSION USING TRANSPARENCY CONTROL BITS

(75) Inventor: John T. Varga, Longmont, CO (US)

(73) Assignee: International Busniness Machines Corporation, Armonk, NY (US)

( * ) Notice: Subject to any disclaimer, the term of this patent is extended or adjusted under 35 U.S.C. 154(b) by 0 days.

(21) Appl. No.: 09/571,519

(22) Filed: May 16, 2000

(51) Int. Cl.
 G06K 9/36 (2006.01)
 H04N 1/32 (2006.01)

(52) U.S. Cl. ............... 382/166; 382/245; 382/239; 358/426.01

(58) Field of Classification Search .......... 382/166, 382/232, 176, 180, 239, 245, 302; 358/296, 358/448, 464, 523, 530, 1.12, 1.15, 426.01, 358/426.16
 See application file for complete search history.

(56) References Cited

U.S. PATENT DOCUMENTS

| 5,388,192 | A | * | 2/1995 | Ohsawa et al. ............. 345/634 |
| RE35,657 | E | * | 11/1997 | Buckley et al. ............. 358/296 |
| 5,754,746 | A | * | 5/1998 | Blurfrushan et al. ....... 358/1.15 |
| 5,764,807 | A | * | 6/1998 | Pearlman et al. ........... 382/240 |
| 5,801,716 | A | | 9/1998 | Silverbrook ................ 345/506 |
| 5,886,701 | A | | 3/1999 | Chauvin et al. ............ 345/418 |
| 5,886,707 | A | | 3/1999 | Berg ............................ 345/619 |
| 5,905,502 | A | | 5/1999 | Deering ...................... 345/420 |
| 5,949,427 | A | | 9/1999 | Nishikawa et al. ......... 345/593 |
| 5,977,977 | A | | 11/1999 | Kajiya et al. ............... 345/418 |
| 5,978,553 | A | | 11/1999 | Ikeda .......................... 358/1.9 |
| 5,982,937 | A | | 11/1999 | Accad ......................... 382/239 |
| 5,999,189 | A | | 12/1999 | Kajiya et al. ............... 382/232 |
| 5,999,710 | A | * | 12/1999 | Smith et al. ................ 358/1.15 |
| 6,006,013 | A | | 12/1999 | Rumph et al. .............. 358/1.15 |
| 6,014,133 | A | | 1/2000 | Yamakado et al. ......... 345/501 |
| 6,028,961 | A | | 2/2000 | Shimomoura ............... 382/239 |
| 6,334,001 | B1 | * | 12/2001 | de Queiroz et al. ........ 382/233 |
| 6,441,913 | B1 | * | 8/2002 | Anabuki et al. ............ 358/1.12 |

OTHER PUBLICATIONS

ITU-T Recommendation T.44 "Mixed raster content (MRC)", Apr. 1999.*

(Continued)

*Primary Examiner*—Wenpeng Chen
(74) *Attorney, Agent, or Firm*—Chambliss, Bahner & Stophel, P.C.; David W. Lynch (57) ABSTRACT

A system, method, and processor-readable medium provide for compressing color data involves a number of pixels defining a region of a display area. The pixel data for each of the pixels includes color data and control data. The control data of particular pixels, having color data not used to contribute to a color of an object in a display area region, is set to a transparent setting. The color data of the particular pixels is set to a selected color code for the entire region and subject to compression. In another embodiment, the particular pixels may include color data not used to contribute to a color of a first object or a second object in the display area region. The color data of particular pixels defining the first object is set to a first color code. The color data of particular pixels defining the second object is set to a second color code. The color data is switched between the first and second color codes at a selected pixel position. The color data of the particular pixels for the first and second display areas is compressed using the respective first and second color codes. Color compression may involve merging the second object of the second color with the first object of the first color.

39 Claims, 8 Drawing Sheets

OTHER PUBLICATIONS

ITU-T Recommendation T.43, "Color and Gray-scale image representations using lossless coding scheme for facsimile," Jul. 1997.*

"Compression of Compound Documents," de Queiroz, R.L. Proceedings of 1999 International Conference on Image Processing vol. 1, Dec. 1999, pp. 209-213.*

D. Butterfield, "High Quality High Compression 8-Bit Digital Video," IBM Technical Disclosure Bulletin, vol. 36, No. 06B, Jun. 1993, pp. 401-404.

"Apparatus And Associate Method For Compression/Decompression of Color Digital Information," IBM Technical Disclosure Bulletin, vol. 40, No. 09, Sep. 1997, pp. 43-44.

Concurrent PostScript Rasterizers Based High Throughput Color Printer Architecture, IBM Technical Disclosure Bulletin, vol. 40, No. 03, Mar. 1997, pp. 141-150.

Mitra et al., "Efficient Color Image Compression Using Integrated Fuzzy Neural Networks For Vector Quantization," Texas Tech University, Dept. of Electrical Engineering, IEEE 1997, pp. 184-188.

Dyck et al., "Subband/VQ Coding of Color Images With Perceptually Optimal Bit Allocation," IEEE Transactions on Circuits And Systems For Video Technology, vol. 4, No. 1, Feb. 1994, pp. 68-81.

* cited by examiner

Color A

Line Work

FIG. 4B

Color A

Line Work (Black)

Transparent (White)

Resulting
Mask (bi-level)
FIG. 4D

Color A

FIG. 4C

Resulting
Color

FIG. 6D
Resulting Mask (bi-level)

FIG. 6C
Resulting Color

SYSTEM AND METHOD FOR OPTIMIZING COLOR COMPRESSION USING TRANSPARENCY CONTROL BITS

CROSS-REFERENCE TO RELATED APPLICATIONS

This application is related to the following co-pending and commonly-assigned patent applications, all of which are filed on the same date herewith:

"Color Image Data and Control Bit Compression Scheme with Run Length Encoding," to Jean M. Aschenbrenner, Stephen D. Hanna, and John T. Varga, now, U.S. Pat. No. 6,721,456, issued Apr. 13, 2004;

"Method, System, Program, and Data Structure for Generating Raster Objects," to Jean M. Aschenbrenner, Christopher Kush, and John T. Varga, U.S. application Ser. No. 09/569,777, filed May 12, 2000, now U.S. Pat. No. 6,850,358, issued Feb. 1, 2005;

"Method, System, and Logic for Selecting Line Work and Control Data for a Pixel from Multiple Objects of Line Work Data Provided for the Pixel" to David E. Finlay and Phillip K. Hoskins, U.S. application Ser. No. 09/570,211, filed May, 12, 2000, now U.S. Pat. No. 6,894,796, issued May 17, 2005.

"System and Method for Merging Line Work Objects Using Tokenization and Selective Compression," U.S. application Ser. No. 09/858,271, filed May 15, 2001 to John T. Varga now U.S. publication 200010055124, published Dec. 27, 2001; and "System and Method for Compressing Color Data Using Expandable Color Palette," U.S. application Ser. No. 09/871,790, filed May 15, 2000.

FIELD OF THE INVENTION

The present invention relates generally to data compression schemes and, more particularly, to color compression schemes.

BACKGROUND OF THE INVENTION

To print an image, a print engine processor, referred to herein as a raster image processor, converts the image in a page description language or vector graphics format to a bit mapped image indicating a value to print at each pixel of the image. The bit mapped image is sent to the printer to cause the print heads to print the specified color value at the pixel according to the information in the bit map. If a printer has multiple print heads, such as a print head for different colors, then bitmaps are generated for each print head. The print heads overlay the images defined by their respective bitmaps onto the print medium.

To produce the bitmaps for the print heads, the raster image processor performs numerous transformations on a print image, which may include different types of data, such as line art, e.g., text and graphics, and continuous tone (contone), e.g., images. The raster image processor usually performs operations such as data compression, color space conversion, and halftoning when generating the raster bit map to print. After dissecting a print image into different components, such as color components, text art, contone, images, etc., the raster image processor must then merge the different elements together so that the original image, previously split into different components, is reconstructed for the color plane process.

As newer printers print at ever higher resolutions and speeds, the amount of data needed to generate the print job correspondingly increases. One of the major limitations in increasing printer speed is the time required to rasterize print data, especially the time required by the raster image processor to break an image into different object components and then reassemble, screen and merge those components into a final bitmap image.

Printer systems have a series of hardware and software operations through which digital data passes in preparation for printing, referred to as a pipeline. The digital data is used by a print engine to form a print image on a print surface using, for examples, a scanning laser beam or an inkjet. An area of the print surface on which the image is formed is referred to as a picture element (pel or pixel). One scan of the laser beam across the print surface forms a row of pixels, referred to as a scan row. As such, the print image is formed with multiple scan rows.

The type of data that passes through the pipeline may include both text, graphics, and image. As printers increase the density of dot placements, particularly with color printing that requires additional bits per pixel over monochrome printing, the time required for the printer's data pipeline to transmit the data becomes substantial. To fully utilize the increasing print speed capabilities of print engines, the pipeline of a printer system must be able to transfer data sufficiently fast to supply a continuous stream of data to the print engine, thereby allowing the print engine to print continuously.

Printer systems typically use data compression and decompression techniques to reduce data size, such that data may be transmitted faster through a printer's pipeline. Data compression refers to a process that attempts to convert data in a given format into an alternative format requiring less space than the original. As such, data compression systems effect a savings in the amount of storage required to hold, or the amount of time required to transmit, a given body of digital information.

In accordance with a known compression method, referred to as run length encoding, the length of continuous identical pixel data is converted into a run length code for transmission. For example, using one run length compression method, the pixel data line "aaaabbbbbbbcccccdd" is converted into the coded data "a4b7c5d2." The coded data consists of bytes of pixel information (a, b, c, and d) and the number of those bytes that are the same (4, 7, 5, and 2). Each byte in this illustrative example contains 8 bits of pixel information.

Such a byte-based compression method may still not provide enough reduction in storage space or transmit time that may be required by current print engines. Further, conventional compression methods may not be targeted to handle multiple bits/pixel. Moreover, prior compression methods may not be efficient in terms of compressing color data.

Thus, there is a need in the art to provide an improved method, system, and program to transform print data, such as text, vector graphics, images and raster data, into a final rasterized bitmaps in a more timely manner to increase printer throughput. The present invention fulfills these and other needs.

SUMMARY OF THE INVENTION

The present invention is directed to a method, system, and processor-readable medium for compressing color data. Pixel data for a number of pixels defining a region of a display area are provided. The pixel data for each of the pixels includes color data of a first bit width and control data of a second bit width, where the first bit width is longer than the second bit width. The control data of particular pixels in the display area region is set to a transparent setting. The particular pixels are pixels having color data that is not used to contribute to a color of an object in the display area region. The color data of each of the particular pixels is set to a selected color code for the entire region. The color data of the particular pixels is compressed using the selected color code of the particular pixels.

Compressing the color data involves expressing the selected color code as a compressed code having a bit width less than the first bit width. The color data may be compressed using a run of the particular pixels having the selected color code. The color data may also be compressed by repeating the selected color code to an end of a scan line defined through the region of the display area or by repeating the selected color code to an end of the object. In one embodiment, the first bit width of the color data is 8 bits and the second bit width of the control data is 2 bits, and compressing the color data involves compressing the 8 bits of color data for at least the particular pixels to 2 bytes.

In accordance with another embodiment of the present invention, a method of compressing color data involves providing pixel data for a number of pixels defining a region of a display area. The control data of particular pixels in the display area region is set to a transparent setting. The particular pixels have color data that is not used to contribute to a color of a first object or a second object in the display area region. The color data of particular pixels of a first display area region defining the first object is set to a first color code. The color data of particular pixels of a second display area region defining the second object is set to a second color code. The color data is switched between the first color code and the second color code at a selected pixel position between the first and second display area regions. The color data of the particular pixels for the first and second display areas is compressed using the respective first and second color codes. Color compression may involve merging the second object of the second color with the first object of the first color.

According to this embodiment, the selected pixel position defines a portion of the display area region comprising pixels having color data that is not used to contribute to a color of the first object or the second object. Switching the color data does not occur upon encountering a non-transparent pixel location if the second color code is equal to the first color code. In one particular embodiment, the selected pixel position is determined using a count of arbitrary data corresponding to a number of transparent pixels encountered and a count of repeat data corresponding to a number of non-transparent pixels encountered. Upon encountering a non-transparent pixel having color data equal to that of the transparent pixels, the color code associated with the arbitrary data is set to the color code of the non-transparent pixel, so as to achieve a longer run length.

Upon encountering a non-transparent pixel having a second color code that is different from the first color code, a run length of the first color code is set to include a repeat data count associated with the first color code plus a count of arbitrary data representing transparent pixels following one or more of the non-transparent pixels having the second color code. The count of arbitrary data following one or more of the non-transparent pixels having the second color code may be determined using runs to an end of a scan line defined through the region of the display area or by using multiple runs of a pre-determined maximum size. The color data of any arbitrary pixels remaining thereafter may be set to the second color code and included in the repeat count and removed from the arbitrary count.

A system for compressing color data according to a further embodiment of the present invention includes memory configured to store pixel data for a number of pixels defining a region of a display area. The pixel data for each of the pixels includes color data of a first bit width and control data of a second bit width, where the first bit width is longer than the second bit width. A processor is coupled to the memory. The processor sets the control data of particular pixels in the display area region to a transparent setting. The processor further sets the color data of each of the particular pixels to a selected color code for the entire region. The processor also compresses the color data of the particular pixels using the selected color code of the particular pixels, such as in a manner discussed above.

According to yet another embodiment of the present invention, a system for compressing color data includes memory configured to store pixel data for a plurality of pixels defining a region of a display area and a processor coupled to the memory. The processor sets the control data of particular pixels in the display area region to a transparent setting. The particular pixels have color data that is not used to contribute to a color of a first object or a second object in the display area region. The color data of particular pixels of a first display area region defining the first object is set by the processor to a first color code. The processor also sets the color data of particular pixels of a second display area region defining the second object to a second color code. The processor further coordinates switching of the color data between the first color code and the second color code at a selected pixel position between the first and second display area regions. The color data of the particular pixels for the first and second display areas is compressed by the processor using the respective first and second color codes, such as in a manner discussed above.

An information bearing medium, according to a further embodiment of the present invention, includes processor readable instructions for compressing color data. The processor readable instructions cause a processor to perform selected process steps described above for compressing color data in accordance with the principles of the present invention.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

A system and methodology in accordance with the principles of the present invention provide for increased compression of color data over prior art approaches, which reduces memory access times and required bandwidth, and minimizes data transfer time between a raster image processor and a color interface card. A color compression approach consistent with the principles of the present invention provides for improved throughput when handling complex color data in microcode, which is particularly advantageous when compressing the data of merged objects.

Figure 1:
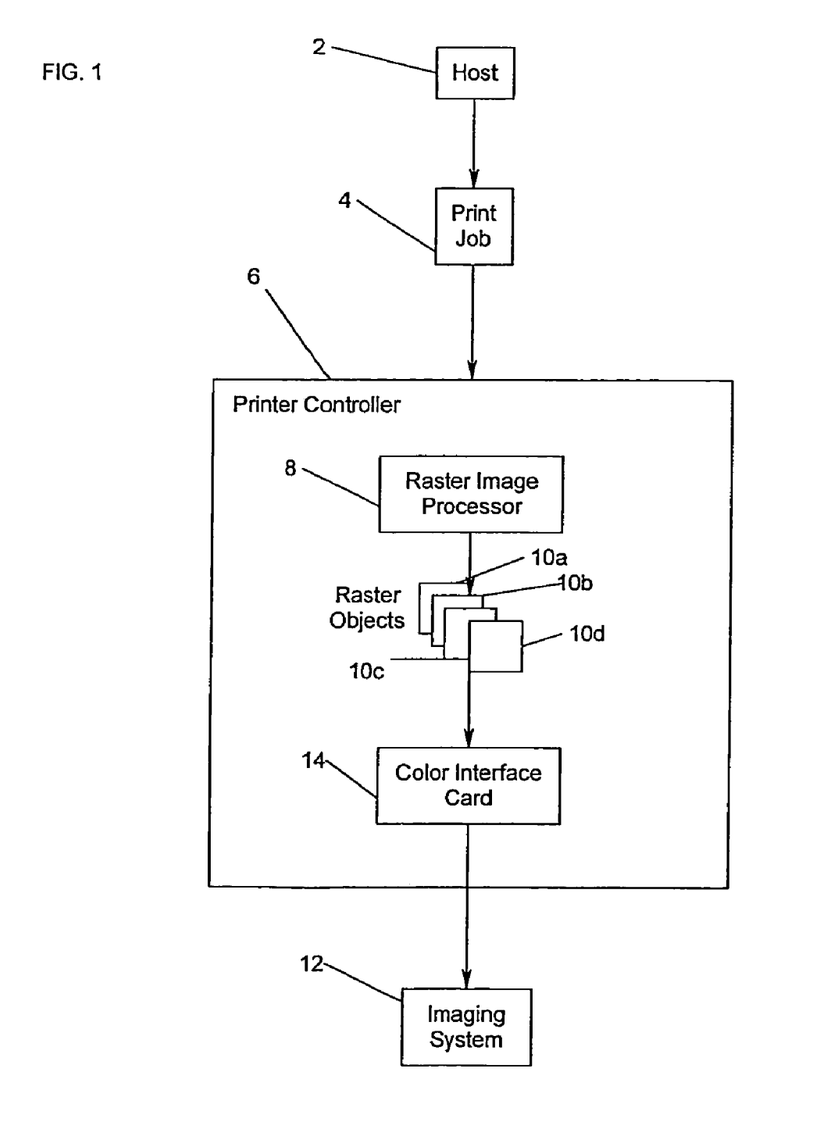
FIG. 1 shows a printing environment in which illustrative embodiments of the present invention are implemented.

Turning now to the figures, and more particularly to FIG. 1, there is illustrated a printing environment within which systems and methods of the present invention may find particular applicability. In accordance with the illustrative embodiment shown in FIG. 1, a host computer 2 generates a print job 4 that may include picture (contone) and line work (text, graphics) components. The host 2 transmits the print job 4 to a printer controller 6 over a cable or network transmission line. The printer controller 6 may comprise a standalone processor or computer, such as the IBM RS/6000 processor. The printer controller 6 includes a raster image processor 8, which is preferably implemented in the RS/6000 main processor and accompanying firmware.

In one embodiment, the raster image processor 8 generates raster objects 10a, b, c, d including the raster data. Each raster object 10a, b, c, d includes pixel information for one color component of the imaging system 12. For example, if the imaging system 12 prints Cyan (C), Magenta (M), Yellow (Y) and black (K), then one raster object would be associated with each color component for a scan line to print. Further, there may be separate raster objects 10a, b, c, d for line art and contone (JPEG images), thus providing eight separate raster objects for each color component of a scan line for the line art and contone components of the line. The printer controller 6 and imaging system 12 components may be implemented in the same large scale printer, such as the International Business Machines (IBM) Corporation's INFOPRINT color printers, or with a separate server and standalone printer communicating over a network or attached directly using a serial or parallel port.

As is further shown in FIG. 1, a color interface card (CIC card) 14 is coupled to the raster image processor 8. The CIC card 14 is preferably implemented on a hardware card, such as a PCI card, using Field Programmable Gate Array (FPGA) logic. The CIC card 14 may be inserted in a PCI slot of the backplane of the printer controller 6. The CIC card 14 performs further processing of the raster objects 10 before the objects 10 are communicated to the imaging system 12 for printing.

In certain implementations, one CIC card 14 is capable of producing print data for two of four color planes. In such a case, two CIC cards are needed to generate the final raster for an output device which uses all four color planes. In duplex implementations, such as where a printer prints on both sides of a sheet concurrently, four CIC cards 14 would be used, two for each side of the sheet to concurrently generate raster data for the print heads printing to both sides of the sheet.

Related patent application entitled "Method, System, Program, And Data Structure for Generating Raster Objects", U.S. application Ser. No. 09/569,777 now U.S. Pat. No. 6,721,456, issued Apr. 13, 2004 describes the process for generating the contone and line work raster objects 10a, b, c, d used by the CIC card 14 to combine and produce the final print output. The raster image processor 8 encodes the line work and contone objects with header information that enables the CIC card 14 logic to combine multiple line work and contone objects per scan line into final print output.

In this way, many of the raster processing operations can be off-loaded to a separate hardware card (e.g., the CIC card 14), thereby relieving the raster image processor 8 of many of the processor intensive raster operations. This, in turn, substantially increases the ultimate printer speed and performance because the final raster output data used by the printer (or other output device) is generated faster by off-loading many of the raster processing operations to dedicated hardware logic implemented in the CIC card 14.

In accordance with an embodiment of the present invention, the CIC card 14 includes hardware logic to handle up to four line work and four contone objects per scan line per color, totaling 16 line work and 16 contone objects per scan line. For this reason, if the raster image processor 8 receives input print data objects including more than four contone or line work objects per scan line, then the raster image processor 8 must merge certain objects to conform to the CIC card 14 hardware limitations. If the CIC card 14 was capable of handling more or less line work or contone objects per scan line, i.e., n objects, then the raster image processor 8 would have to merge input print data objects to ensure that there are no more than n line work or n contone objects per scan line.

The raster image processor 8 will generate contone objects that provide eight bits per pel for contone (CT) color data and line work objects that provide eight bits per pel for the line work (LW) color data. The raster image processor 8 further generates two line work control (LWC) bits for each pixel in the line work object. The line work control (LWC) bits can be encoded with one of three values, namely, select line work (LW), select contone (CT) or transparent values. The select line work (LW) value instructs the CIC card 14 to use the pixel data in the line work object over data for the pixel in any other line work object or contone object. The select contone (CT) value instructs the CIC card 14 to use the pixel data in the highest priority contone (CT) object over data for the pixel in any line work (LW) object.

Another line work control bit value, which represents the transparent value, instructs the CIC card 14 to consider the line work control (LWC) bits in the next highest priority line work control object. In other words, the transparent value instructs the CIC card 14 to consider the instant pixel to be transparent, and the next lower order line work data should be considered to determine whether it is non-transparent and used. The transparent LWC bit setting effectively provides a control mask which indicates whether color data for a particular pixel should be displayed (is non-transparent) or not displayed (is transparent). As will be described in greater detail hereinbelow, the LWC bits controlling pixel transparency are advantageously manipulated to provide for optimized color compression in accordance with the principles of the present invention.

Figure 2:
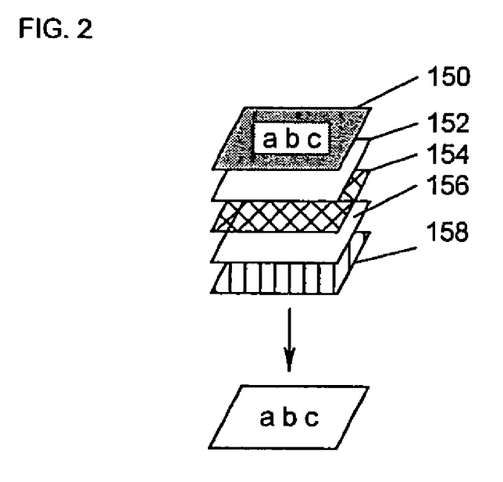
FIG. 2 illustrates an example of the component objects of a bi-level display item in accordance with an embodiment of the present invention.

For purposes of enhancing an understanding of the present invention, FIG. 2 is provided to illustrate the four color planes specified in the CMYK color scheme which may be combined to define the color of a display item, such as a bi-level display item. In general terms, a display item includes a bit map of data indicating what to display for pixels on one or more scan lines. The raster image processor 8 would further generate a set of properties for each line work and contone display item, indicating the display item size, position information for the color data on the sheet, and a control mask.

As discussed previously, a control mask is used to indicate whether color data for a particular pixel in the display item should be displayed (is non-transparent) or not displayed (is transparent). Display item types include solid rectangles, bi-level bitmaps, paletted bitmaps, JPEG image, etc. A solid rectangle display item, for example, would include CMYK color data, height and width data and position data on the sheet for the solid shape.

A bi-level display item, such as one comprising text, bi-level images or bar code for example, has only a single color. A bi-level display item includes four one byte color objects for each of the four color planes CMYK and a line work mask. The combination of the colors for each of the four color planes specified in the CMYK color objects together define the color of the bi-level display item. The line work mask comprises a bit value for each pixel of the bi-level image area. An "on" value indicates that the bi-level image provides color for that pixel corresponding to the "on" value (non-transparent data). An "off" mask value indicates that the color data is not to be used for the pixel (transparent).

FIG. 2 provides an example of the component objects of a bi-level display item for the text string "a b c." Line work objects 152, 154, 156, and 158 each provide a one byte color value for one of C, M, Y and K and a line work mask 150. The white part of the line work mask 150 represents the non-transparent pixels for which the color defined by the CMYK objects 152–158 is used. The black areas of the line work mask 150 represent the transparent portions for which the color data is not used. Thus, the letters appear through the non-transparent pixels indicated in the control mask.

Figure 3:
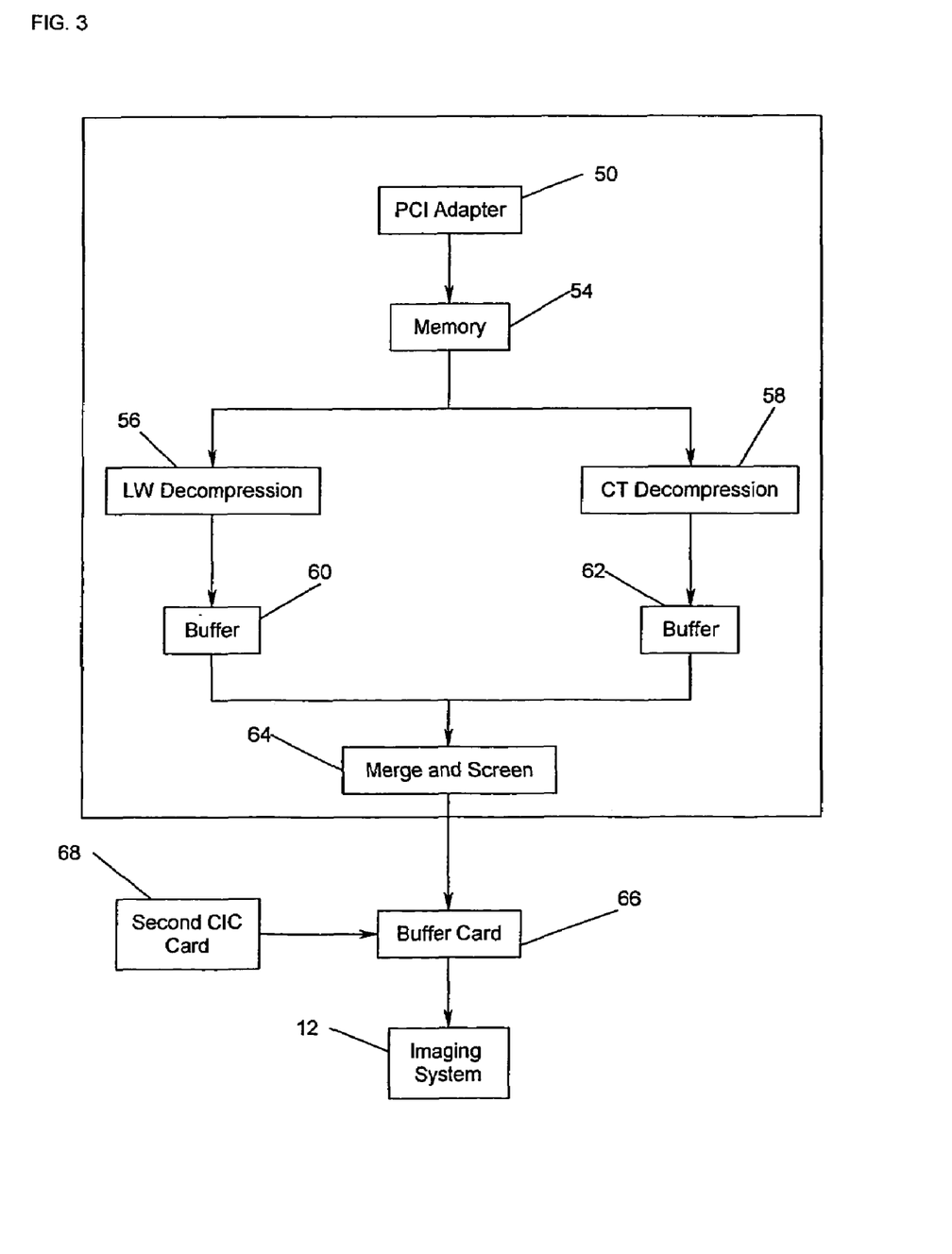
FIG. 3 illustrates hardware architecture implemented in a card that processes compressed color data according to an embodiment of the present invention.

Referring now to FIG. 3, there is shown in greater detail various elements of a CIC card 14 which cooperates with the raster image processor 8 of the printer controller shown in FIG. 1. The CIC card 14 hardware retrieves the generated raster objects 10a, b, c, d, i.e., line work and contone objects, from the raster image processor 8 memory to generate final raster output for the imaging system 12. FIG. 3 illustrates an architectural embodiment of the CIC card 14 shown in FIG. 1.

The CIC card 14 depicted in FIG. 3 includes a peripheral component interconnect (PCI) adaptor 50, which includes logic to retrieve line work and contone objects from the raster image processor 8. Memory 54 buffers and stores the retrieved line work and contone objects and their headers. The memory 54 may comprise one or more memory cards for storing the header data, line work (LW) objects, contone (CT) objects, and line work control (LWC) objects. The line work (LW) decompression logic 56 decompresses line work and line work control (LWC) objects, and the contone (CT) decompression logic 58 decompresses contone objects. The decompressor logic 56 and 58 writes the decompressed data into buffers 60 and 62, respectively.

The merge and screen logic 64 accesses a byte of contone data from the contone (CT) buffer 62 and a byte of line work data from the line work buffer 60. Based on the value of the line work control (LWC) bits, i.e., line work select or contone select, the merge component of the logic 64 would merge the data into a single byte of data, from either the line work or contone data, and pass the merged data to the screening algorithm. Depending on the type of data, i.e., contone or line work, the screening logic would screen the data to provide the proper color intensity, and then write the data to the buffer card 66, which also receives pel data for two other color planes from a second CIC card 68. As discussed, in certain implementations, each CIC card 14 handles two color planes, thus requiring two cards for all four CMYK color planes.

In the following illustrative embodiments, an object, defined by the pixel data, may be a rectangle having multiple bytes per scan line. The pixel data for the rectangle may be evaluated one scan line at a time to determine if the pixel data, and more particularly to the pixel color data, is to be compressed. If consecutive pixel color data is identified to be same, the consecutive pixel data may be represented in a compressed format to provide the same pixel color data information in a reduced space. In one embodiment, the compressed object represented by a data stream is assumed to have a scan length that is a multiple of 4 pixels (32 bits).

It should be noted that the color compression methodology of the present invention is not limited to the evaluation of pixel data one scan line at a time. In an alternative embodiment, the scan line boundaries may be ignored in order to provide enhanced compression. For example, a rectangle may have a width significantly less than the maximum run. As such, it may be more efficient to compress a series of identical scan line runs with a single run which encompasses those scan lines, rather than as a series of end of scan (EOS) codes, one per scan line. By way of further example, it may be desirable to employ a color compression methodology that utilizes a single run which encompasses a series of identical scan lines based on end of object (EOO) codes (e.g., the remainder of the current scan line and all the remaining scan lines of the object).

In accordance with the principles of the present invention, the line work control (LWC) bits of the CIC card 14 are advantageously manipulated by the raster image processor 8 to implement a color compression methodology of the present invention. In broad and general terms, the line work control (LWC) bits of the CIC card 14 are used to declare a segment of a display area as transparent. Normally, this LWC bit setting allows background pixels of an overlaying object (e.g., a font character) to allow an underlying object (e.g., another font character) to show behind the top object.

The line work control (LWC) bits must be set to indicate which pixels are not part of the stroked lines that make up the character. The line work control (LWC) bits for the pixels which are not part of the stroked lines that make up the character are set to a transparent setting. After the line work control (LWC) bits have been set to define the line work in the pixel data, the color data of each of the pixels within the entire bitmap area may be set to a desired color. The desired color is typically one that optimizes color data compression.

By way of further example, FIG. 4 depicts a first object representative of a text character (letter "A") having a first color (e.g., color A=yellow). FIG. 4 further shows a progression of illustrations that depict the result of various process steps involving the compression of color data according to an embodiment of the present invention. FIG. 5 depicts several of these process steps in flow diagram form. According to this illustrative example, it is assumed that the text character "A" consists of a rectangular bitmap of pixels.

With continued reference to FIGS. 4 and 5, a first object (e.g., object including text character "A") of a first color (e.g., yellow) is provided 200 by the raster image processor 8. The raster image processor 8 sets 202 line work control (LWC) bits of the pixels to define the line work for the character "A" in the pixel data. The raster image processor 8 identifies 204 those pixels that are not associated with the line work for the character "A." The raster image processor 8 sets 206 the line work control (LWC) bits of pixels not associated with the line work for the character "A" to a transparent setting. The color data for each pixel within the bitmap area is then set 208 to a desired color by the raster image processor 8. The raster image processor 8 then generates 210 compressed color data for the entire bitmap area.

Figure 4A:
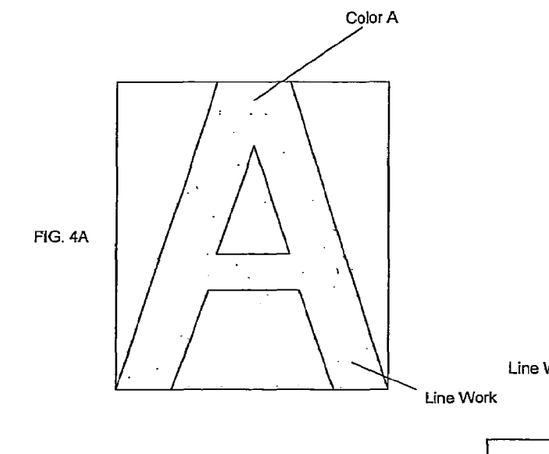
FIGS. 4(A)–4(C) shows a progression of illustrations that depict the result of various process steps involving the compression of color data according to an embodiment of the present invention.
Figure 4B:
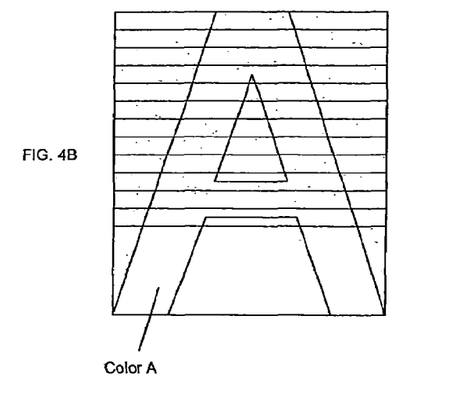
Figure 4C:
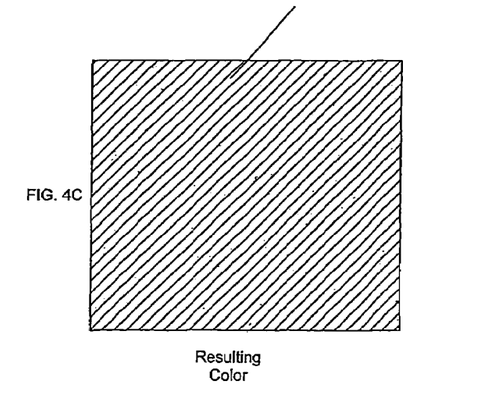
Figure 4D:
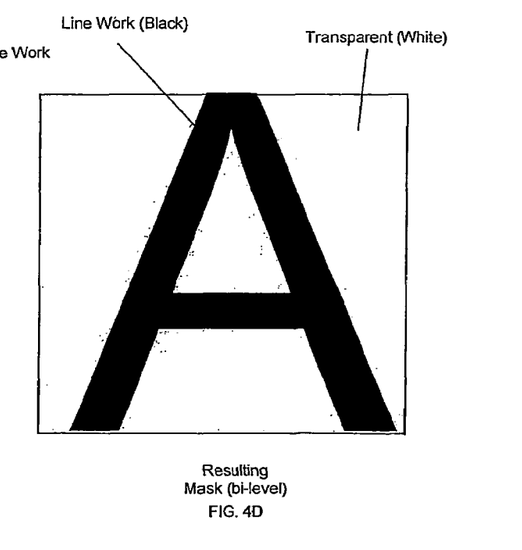
Figure 5:
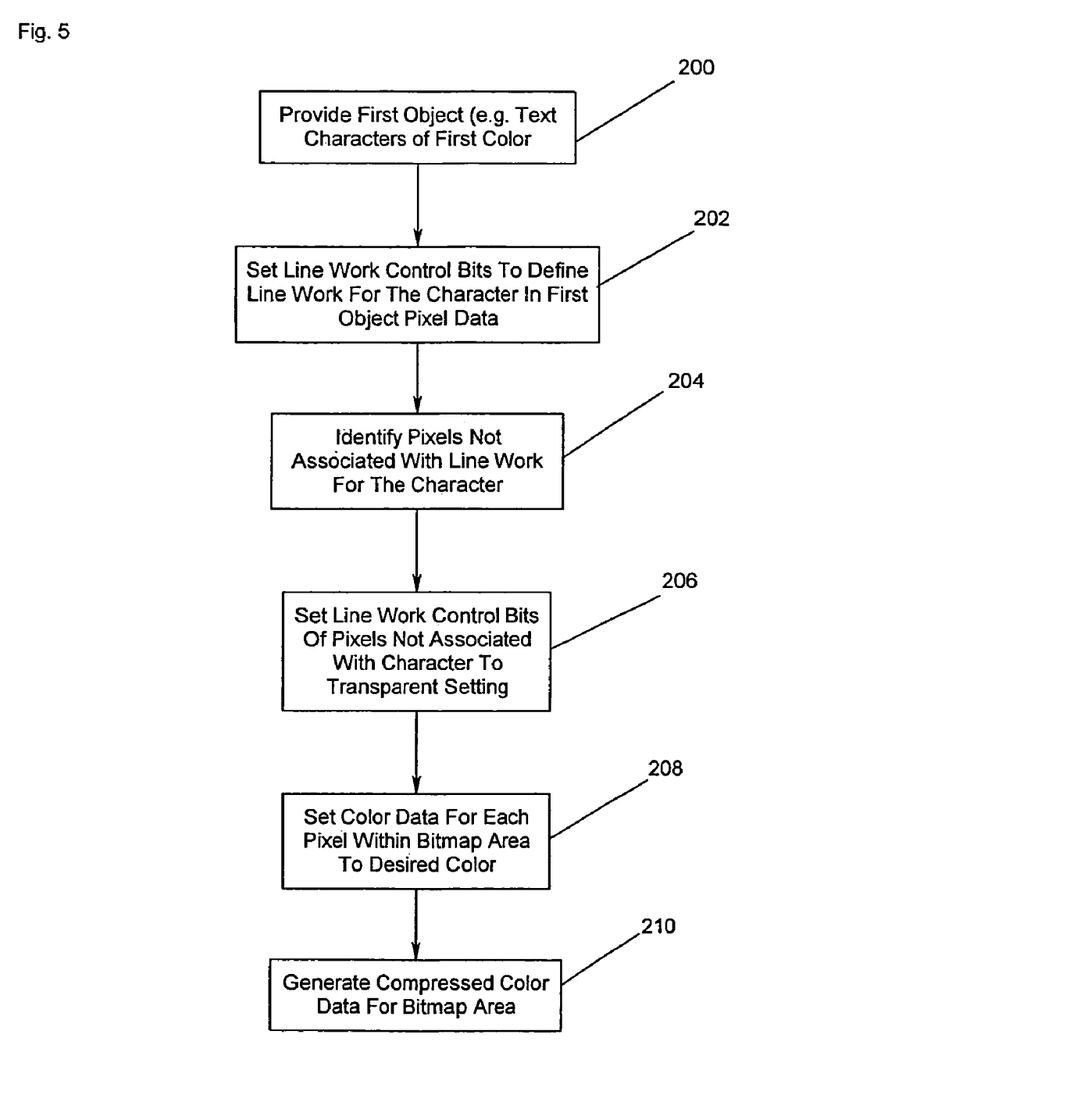
FIG. 5 depicts several process steps involving the compression of color data according to an embodiment of the present invention.

According to this illustrative example, FIG. 4A shows a first object representative of the text character "A" having a first color (e.g., yellow). FIG. 4B depicts the process of decoding the compressed color data by a CIC card 14. The resulting color and bi-level mask are respectively depicted in FIGS. 4C and 4D. It is noted that the resulting bi-level mask shown in FIG. 4D includes black line work representative of the text character "A" and white transparent portions, and that FIG. 4C shows the single resultant color (e.g., yellow) resulting from decompression of the color data compressed in accordance with the present invention.

In this illustrative example, it may be assumed that each pixel is defined to include eight bits of color data and two bits of line work control (LWC) data. It is further assumed that four color planes are used in accordance with the CMYK color scheme (e.g., 32-bit full color, 4 planes with 8-bit bitmaps). By judiciously manipulating the 2-bit line work control (LWC) bits between transparent and non-transparent states depending on the line work in the data that describes, for example, a character, the larger 8-bit color data for the implicated pixels may be compressed to two bytes.

Figure 6A:
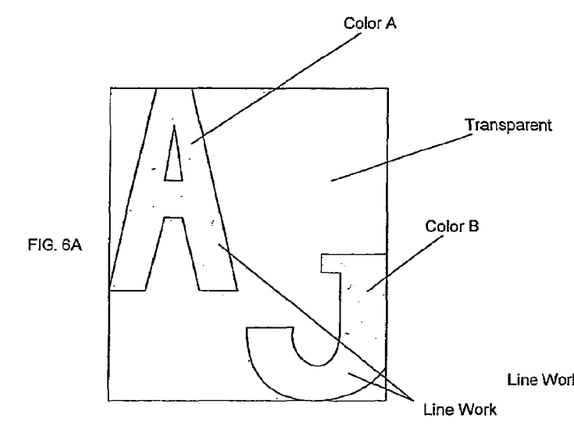
FIGS. 6(A)–6(C) shows a progression of illustrations that depict the result of various process steps involving the compression of color data according to another embodiment of the present invention.
Figure 6B:
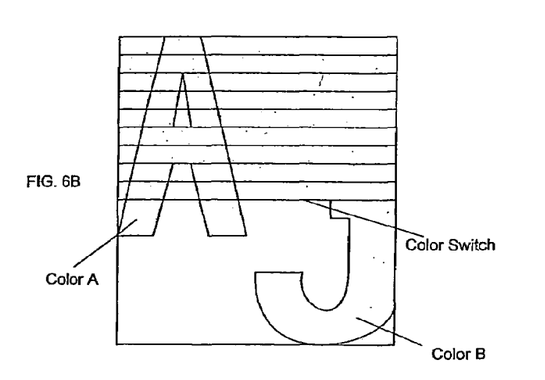
Figure 6C:
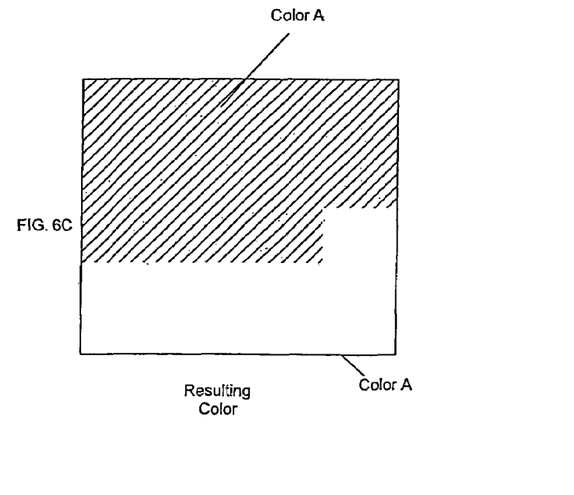
Figure 6D:
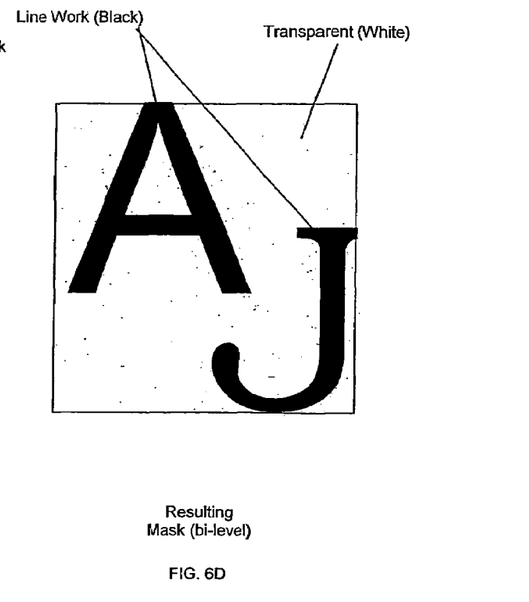
Figure 7A:
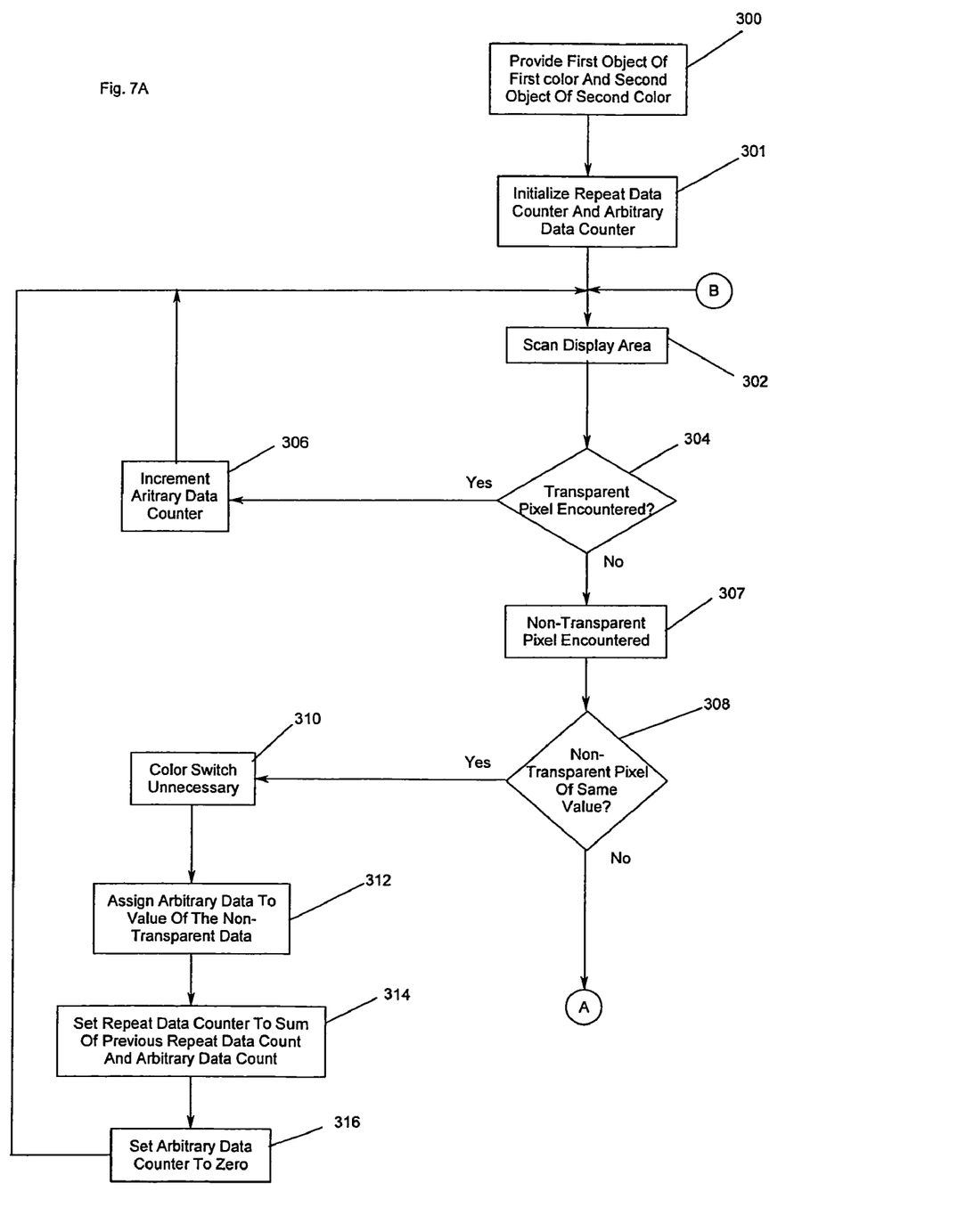
FIGS. 7(A)–(B) depicts several process steps involving the compression of color data according to another embodiment of the present invention.
Figure 7B:
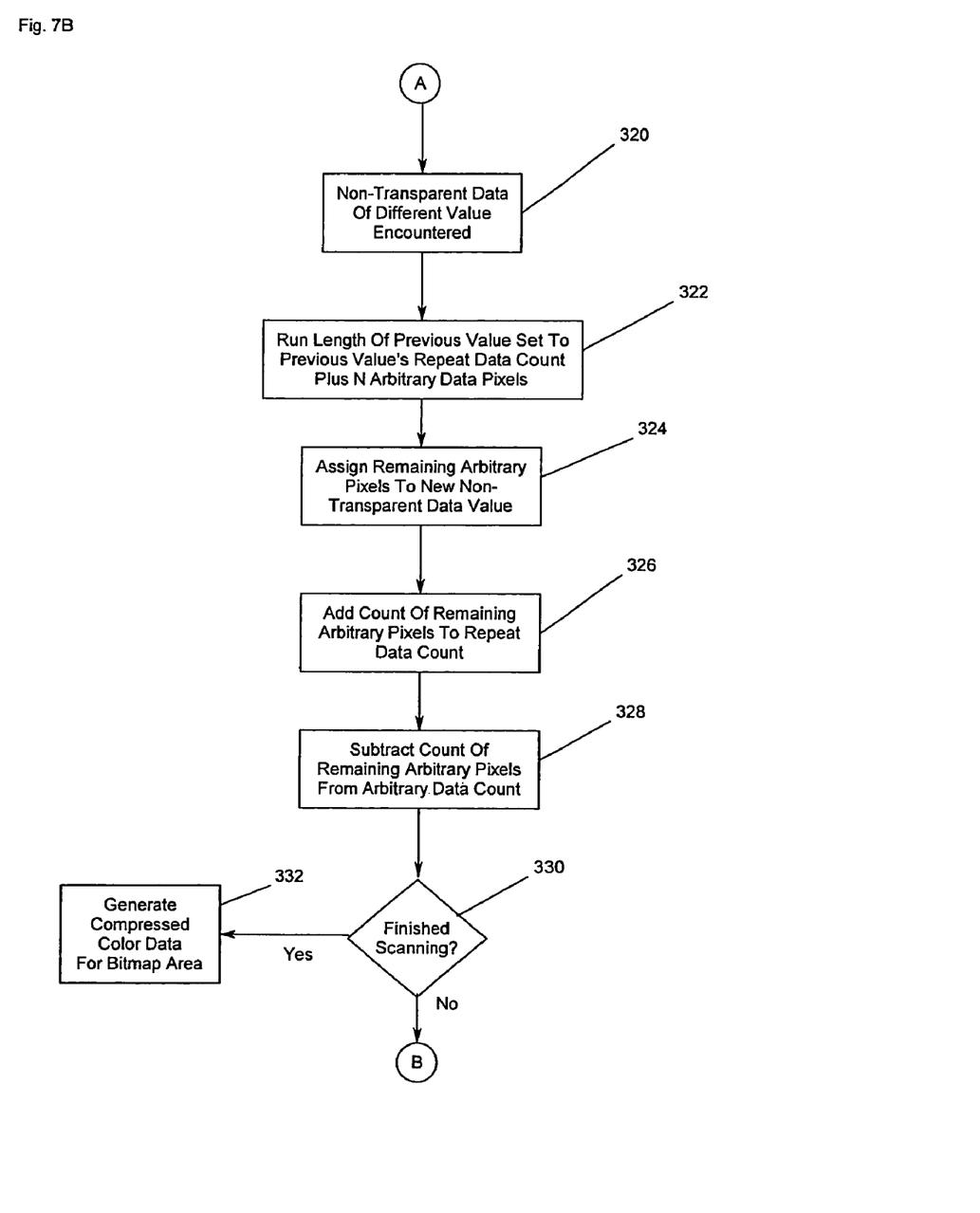

FIG. 6 illustrates a first object representative of a text character "A" having a first color (e.g., yellow) and a second object representative of a text character "J" having second color (.e.g., orange). FIG. 6 further shows a progression of illustrations that depict the result of various process steps involving the compression of color data according to another embodiment of the present invention. FIG. 7 depicts several of these process steps in flow diagram form.

In the case in which a second object is merged with the first object, where the color associated with the second object is different from that of the first object, the 8-bit color data must be switched between the two colors in order to display the correct color at each non-transparent pixel location. Since the area within the display segment which is transparent includes the area where neither color will be used, it is desirable to select an optimal pixel location to perform the switch between the colors, such that maximum compression is achieved.

According to one embodiment of the present invention, switching between colors at an optimal pixel location is accomplished by maintaining counters for both repeat data of a selected color value and arbitrary data which follows. The term arbitrary data is intended to refer to data associated with pixels whose line work control (LWC) bits has been set to a transparent setting, since the color data of these pixels are not used within the display segment.

Referring now to FIGS. 7A and 7B, the raster image processor 8 provides 300 a first object (e.g., text character "A") of a first color (e.g., yellow) and a second object (e.g., text character "J") of a second color (e.g., orange). A repeat data counter and an arbitrary data counter are respectively initialized 301 (e.g., set to zero). The raster image processor 8 scans 302 the display area which contains the first and second text character objects, "A" and "J." If 304 a transparent pixel is encountered, the arbitrary data counter is incremented 306 for this pixel and each consecutive transparent pixel encountered, until a non-transparent pixel is encountered 307.

If 308 the non-transparent pixel has color data representative of the same color value as the arbitrary data, then a color switch is not necessary 310. In this case, the arbitrary data (i.e., color data of the previous transparent pixels) is assigned 312 the color value of the non-transparent data to achieve a longer run length. This is accomplished by setting 314 the repeat count of the repeat data counter to the sum of the previous repeat count and the arbitrary count of the arbitrary data counter. The arbitrary count of the arbitrary data counter is then set 316 to zero.

If 308 the non-transparent pixel has color data representative of a color different 320 from that of the arbitrary data, the run length of the previous color value is set 322 to include the previous color value's repeat data count plus as many arbitrary data pixels as can be efficiently included. The number of arbitrary data pixels that can be efficiently included may, for example, be determined using runs to the end of the scan line or multiple runs of the maximum size (e.g., 508 pixels). The color data of the remaining arbitrary pixels are then assigned 324 the new non-transparent pixel's color value, and are included 326 in the repeat count and removed 328 from the arbitrary count. This advantageously places arbitrary transitions at 4-pixel boundaries so the more inefficient pass-thru mode does not have to be used.

The above-described process for optimizing the pixel location for performing a color switch in connection with a color compression methodology of the present invention is repeated 330 until the scan of the display area is completed. The raster image processor 8 may then generate 332 compressed color data for the display area.

For example, the raster image processor 8 may generate compressed color data using the run length encoding schemes disclosed in related applications entitled "Color Image Data and Control Bit Compression Scheme with Run Length Encoding, now U.S. Pat. No. 6,721,456, issued Apr. 13, 2004, and "System and Method for Merging Line Work Objects Using Tokenization and Selective Compression," now U.S. publication 20010055124, published Dec. 27, 2001.

Embodiments of the present invention may be implemented as a method, apparatus or information bearing media using standard programming and/or engineering techniques to produce software, firmware, hardware, or any combination thereof. The programs defining the functions of the various embodiments can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent further embodiments of the present invention.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of compressing color data, comprising:
providing pixel data for a plurality of pixels defining a region that is a proper subset of a display area, the pixel data for each of the pixels comprising color data of a first bit width and control data of a second bit width, the first bit width being longer than the second bit width;
setting the control data of particular pixels in the region that is a proper subset of the display area to a transparent setting when the particular pixel is not used to contribute to a color of an object in the display area region;
setting the color data of each of the particular pixels to a selected color code for the entire region; and
compressing the color data of the particular pixels using the selected color code of the particular pixels;
wherein compressing the color data further comprises compressing the color data using a run of the particular pixels having the selected color code.

2. The method of claim 1, wherein compressing the color data further comprises compressing the color data by expressing the selected color code as a compressed code having a bit width less than the first bit width.

3. The method of claim 1, wherein compressing the color data further comprises compressing the color data by repeating the selected color code to an end of a scan line defined through the region that is a proper subset of the display area.

4. The method of claim 1, wherein compressing the color data further comprises compressing the color data by repeating the selected color code to an end of the object.

5. The method of claim 1, wherein the first bit width of the color data is 8 bits and the second bit width of the control data is 2 bits, and compressing the color data further comprises compressing the 8 bits of color data for at least the particular pixels to 2 bytes.

6. A method of compressing color data, comprising:
providing pixel data for a plurality of pixels defining a region that is a proper subset of a display area, the pixel data for each of the pixels comprising color data of a first bit width and control data of a second bit width, the first bit width being longer than the second bit width;
setting the control data of particular pixels in the region that is a proper subset of the display area to a transparent setting, the particular pixels having color data that is not used to contribute to a color of a first object or a second object in the region that is a proper subset of the display area;
setting the color data of particular pixels of a first region that is a proper subset of the display area defining the first object to a first color code;
setting the color data of particular pixels of a second region that is a proper subset of the display area defining the second object to a second color code;
switching the color data between the first color code and the second color code at a selected pixel position between the first and second regions that are proper subsets of the display area; and
compressing the color data of the particular pixels for the first and second regions that are proper subsets of the display area using the respective first and second color codes.

7. The method of claim 6, wherein the selected pixel position defines a portion of the region that is a proper subset of the display area comprising pixels having color data that is not used to contribute to a color of the first object or the second object.

8. The method of claim 6, wherein the second object of the second color is merged with the first object of the first color.

9. The method of claim 6, wherein switching the color data does not occur upon encountering a non-transparent pixel location if the second color code is equal to the first color code.

10. The method of claim 6, wherein the selected pixel position is determined using a count of arbitrary data associated with a number of transparent pixels encountered and a count of repeat data associated with a number of non-transparent pixels encountered.

11. The method of claim 6, further comprising:
determining a count of arbitrary data associated with a number of transparent pixels encountered; and
upon encountering a non-transparent pixel having color data equal to that of the transparent pixels, setting the color code associated with the arbitrary data to the color code of the non-transparent pixel, so as to achieve a longer run length.

12. The method of claim 6, further comprising:
determining a count of arbitrary data associated with a number of transparent pixels having a first color code encountered; and
upon encountering a non-transparent pixel having a second color code that is different from the first color code, setting a run length of the first color code to include a repeat data count associated with the first color code plus a count of arbitrary data representing transparent pixels following one or more of the non-transparent pixels having the second color code.

13. The method of claim 12, wherein the count of arbitrary data following one or more of the non-transparent pixels having the second color code is determined using runs to an end of a scan line defined through the region that is a proper subset of the display area.

14. The method of claim 12, wherein the count of arbitrary data following one or more of the non-transparent pixels having the second color code is determined using multiple runs of a pre-determined maximum size.

15. The method of claim 12, wherein:

the count of arbitrary data following one or more of the non-transparent pixels having the second color code is determined using runs to an end of a scan line defined through the region that is a proper subset of the display area or using multiple runs of a pre-determined maximum size; and the color data of any arbitrary pixels remaining thereafter are set to the second color code and included in the repeat count and removed from the arbitrary count.

16. A system for compressing color data, comprising:

memory configured to store pixel data for a plurality of pixels defining a region that is a proper subset of a display area, the pixel data for each of the pixels comprising color data of a first bit width and control data of a second bit width, the first bit width being longer than the second bit width; and a processor coupled to the memory, the processor:
   setting the control data of particular pixels in the region that is a proper subset of the display area to a transparent setting when the particular pixel is not used to contribute to a color of an object in the region that is a proper subset of the display area;
   setting the color data of each of the particular pixels to a selected color code for the entire region; and
   compressing the color data of the particular pixels using the selected color code of the particular pixels;
   wherein the processor compresses the color data using a run of the particular pixels having the selected color code.

17. The system of claim 16, wherein the processor compresses the color data by expressing the selected color code as a compressed code having a bit width less than the first bit width.

18. The system of claim 16, wherein the processor compresses the color data by repeating the selected color code to an end of a scan line defined through the region that is a proper subset of the display area.

19. The system of claim 16, wherein the processor compresses the color data by repeating the selected color code to an end of the object.

20. The system of claim 16, wherein the first bit width of the color data is 8 bits and the second bit width of the control data is 2 bits, and the processor compresses the 8 bits of color data for at least the particular pixels to 2 bytes.

21. A system for compressing color data, comprising:

memory configured to store pixel data for a plurality of pixels defining a region that is a proper subset of a display area, the pixel data for each of the pixels comprising color data of a first bit width and control data of a second bit width, the first bit width being longer than the second bit width; and a processor coupled to the memory, the processor:
   setting the control data of particular pixels in the region that is a proper subset of the display area to a transparent setting, the particular pixels having color data that is not used to contribute to a color of a first object or a second object in the region that is a proper subset of the display area;
   setting the color data of particular pixels of a first region that is a proper subset of the display area defining the first object to a first color code;
   setting the color data of particular pixels of a second region that is a proper subset of the display area defining the second object to a second color code;
   switching the color data between the first color code and the second color code at a selected pixel position between the first and second regions that are proper subsets of the display area; and
   compressing the color data of the particular pixels for the first and second regions that are proper subsets of the display area using the respective first and second color codes.

22. The system of claim 21, wherein the selected pixel position defines a portion of the region that is a proper subset of the display area comprising pixels having color data that is not used to contribute to a color of the first object or the second object.

23. The system of claim 21, wherein processor merges the second object of the second color with the first object of the first color.

24. The system of claim 21, wherein the processor does not switch the color data upon encountering a non-transparent pixel location if the second color code is equal to the first color code.

25. The system of claim 21, wherein the processor determines the selected pixel position using a count of arbitrary data associated with a number of transparent pixels encountered and a count of repeat data associated with a number of non-transparent pixels encountered.

26. The system of claim 21, wherein the processor further:
   determines a count of arbitrary data associated with a number of transparent pixels encountered; and
   upon encountering a non-transparent pixel having color data equal to that of the transparent pixels, sets the color code associated with the arbitrary data to the color code of the non-transparent pixel, so as to achieve a longer run length.

27. The system of claim 21, wherein the processor further:
   determines a count of arbitrary data associated with a number of transparent pixels having a first color code encountered; and
   upon encountering a non-transparent pixel having a second color code that is different from the first color code, sets a run length of the first color code to include a repeat data count associated with the first color code plus a count of arbitrary data representing transparent pixels following one or more of the non-transparent pixels having the second color code.

28. The system of claim 27, wherein the processor further determines the count of arbitrary data following one or more of the non-transparent pixels having the second color code using runs to an end of a scan line defined through the region that is a proper subset of the display area.

29. The system of claim 27, wherein the processor further determines the count of arbitrary data following one or more of the non-transparent pixels having the second color code using multiple runs of a pre-determined maximum size.

30. The system of claim 27, wherein the processor further:
   determines the count of arbitrary data following one or more of the non-transparent pixels having the second color code using runs to an end of a scan line defined through the region that is a proper subset of the display area or using multiple runs of a pre-determined maximum size; and
   the color data of any arbitrary pixels remaining thereafter are set by the processor to the second color code and are included in the repeat count and removed from the arbitrary count.

31. A information bearing medium comprising processor readable instructions for compressing color data, the processor readable instructions causing a processor to perform the steps of:

providing pixel data for a plurality of pixels defining a region that is a proper subset of a display area, the pixel data for each of the pixels comprising color data of a first bit width and control data of a second bit width, the first bit width being longer than the second bit width;

setting the control data of particular pixels in the region that is a proper subset to a transparent setting when a particular pixel is not used to contribute to a color of an object in the region that is a proper subset of the display area;

setting the color data of each of the particular pixels to a selected color code for the entire region; and compressing the color data of the particular pixels using the selected color code of the particular pixels;

wherein compressing the color data further comprises compressing the color data by repeating the selected color code to an end of a scan line defined through the region that is a proper subset of the display area or by repeating the selected color code to an end of the object.

32. The medium of claim 31, wherein compressing the color data further comprises compressing the color data by expressing the selected color code as a compressed code having a bit width less than the first bit width.

33. A information bearing medium comprising processor readable instructions for compressing color data, the processor readable instructions causing a processor to perform the steps of:

providing pixel data for a plurality of pixels defining a region that is a proper subset of a display area, the pixel data for each of the pixels comprising color data of a first bit width and control data of a second bit width, the first bit width being longer than the second bit width;

setting the control data of particular pixels in the region that is a proper subset of the display area to a transparent setting, the particular pixels having color data that is not used to contribute to a color of a first object or a second object in the region that is a proper subset of the display area;

setting the color data of particular pixels of a first region that is a proper subset of the display area defining the first object to a first color code;

setting the color data of particular pixels of a second region that is a proper subset of the display area defining the second object to a second color code;

switching the color data between the first color code and the second color code at a selected pixel position between the first and second regions that are proper subsets of the display areas; and compressing the color data of the particular pixels for the first and second regions hat are proper subsets of the display area using the respective first and second color codes.

34. The medium of claim 33, wherein the processor readable instructions causes the processor to perform the step of merging the second object with the first object of the first color.

35. The medium of claim 33, wherein switching the color data does not occur upon encountering a non-transparent pixel location if the second color code is equal to the first color code.

36. The medium of claim 33, wherein the selected pixel position is determined using a count of arbitrary data associated with a number of transparent pixels encountered and a count of repeat data associated with a number of non-transparent pixels encountered.

37. The medium of claim 33, further comprising:

determining a count of arbitrary data associated with a number of transparent pixels having a first color code encountered; and upon encountering a non-transparent pixel having a second color code that is different from the first color code, setting a run length of the first color code to include a repeat data count associated with the first color code plus a count of arbitrary data representing transparent pixels following one or more of the non-transparent pixels having the second color code.

38. The medium of claim 37, wherein the count of arbitrary data following one or more of the non-transparent pixels having the second color code is determined using runs to an end of a scan line defined through the region that is a proper subset of the display area or using multiple runs of a pre-determined maximum size.

39. The medium of claim 37, wherein:

the count of arbitrary data following one or more of the non-transparent pixels having the second color code is determined using runs to an end of a scan line defined through the region that is a proper subset of the display area or using multiple runs of a pre-determined maximum size; and the color data of any arbitrary pixels remaining thereafter are set to the second color code and included in the repeat count and removed from the arbitrary count.

* * * * *

UNITED STATES PATENT AND TRADEMARK OFFICE
CERTIFICATE OF CORRECTION

| | | |
|---|---|---|
| PATENT NO. | : 7,062,087 B1 | Page 1 of 1 |
| APPLICATION NO. | : 09/571519 | |
| DATED | : June 13, 2006 | |
| INVENTOR(S) | : John T. Varga | |

It is certified that error appears in the above-identified patent and that said Letters Patent is hereby corrected as shown below:

Col. 16, Line 2: "hat" should read -- that --.

Signed and Sealed this

Twelfth Day of September, 2006

JON W. DUDAS
*Director of the United States Patent and Trademark Office*